United States Patent [19]

Jehle

[11] Patent Number: 4,982,092

[45] Date of Patent: Jan. 1, 1991

[54] 360 DEGREE OPTICAL SURVEILLANCE SYSTEM

[75] Inventor: Robert E. Jehle, Silver Spring, Md.

[73] Assignee: The United States of America as represented by the Secretary of the Navy, Washington, D.C.

[21] Appl. No.: 377,670

[22] Filed: Jul. 5, 1973

[51] Int. Cl.$^5$ .................. H01L 25/00; G02B 26/10; G02B 23/02; G03B 37/00

[52] U.S. Cl. ........................ 250/332; 250/334; 350/538; 350/539; 350/540; 352/69; 358/108; 358/113

[58] Field of Search ............... 250/338, 330, 331, 332, 250/333, 334; 352/69, 70, 71; 178/7.3 D, 7.5 D, 7.6; 350/21, 22, 23, 538, 539, 540; 358/108, 113

[56] References Cited

U.S. PATENT DOCUMENTS

| | | | |
|---|---|---|---|
| 3,514,186 | 5/1970 | Poncelet | 350/21 |
| 3,715,497 | 2/1973 | Cooper et al. | 178/7.6 |
| 3,740,469 | 6/1973 | Herndon | 178/7.6 |
| 3,781,559 | 12/1973 | Cooper et al. | 250/334 |

Primary Examiner—Stephen C. Buczinski
Attorney, Agent, or Firm—Kenneth E. Walden

[57] ABSTRACT

A 360 degree surveillance system for detecting an infrared IR signal coming from a scene. The IR signal is reflected by the scanning mirror to an imaging lens. The scanning mirror rotates 360 degrees around a vertical axis. The imaging lens images the IR signal through a derotator onto a linear array of IR detectors. The derotator serves to keep the image of the IR scene in a proper orientation. The detectors sense the IR signal and produce a current proportional to its strength. Each detector is the beginning of a channel of information. Each channel has operational amplifiers to process the signal, control gain, restore dc, etc. The output of the amplifiers are fed to a linear array of LED's. The light output of the LED's passes through a rotator and is imaged by a projector lens, after reflection off a rotating mirror, onto a cylindrical screen. The purpose of the rotator is to keep the image of the LED's in the proper orientation on the screen. The purpose of the rotating projector mirror is to synchronously reflect the light from the LED's onto the screen so that there exists a constant relationship between the image produced on the screen to that seen by the detectors through the scanning mirror.

5 Claims, 5 Drawing Sheets

SYSTEM BLOCK DIAGRAM

SYSTEM DIAGRAM

PANORAMIC
DISPLAY DEVICE

PANORAMIC
DISPLAY SCREEN

FIG. 5
TV DISPLAY DEVICE
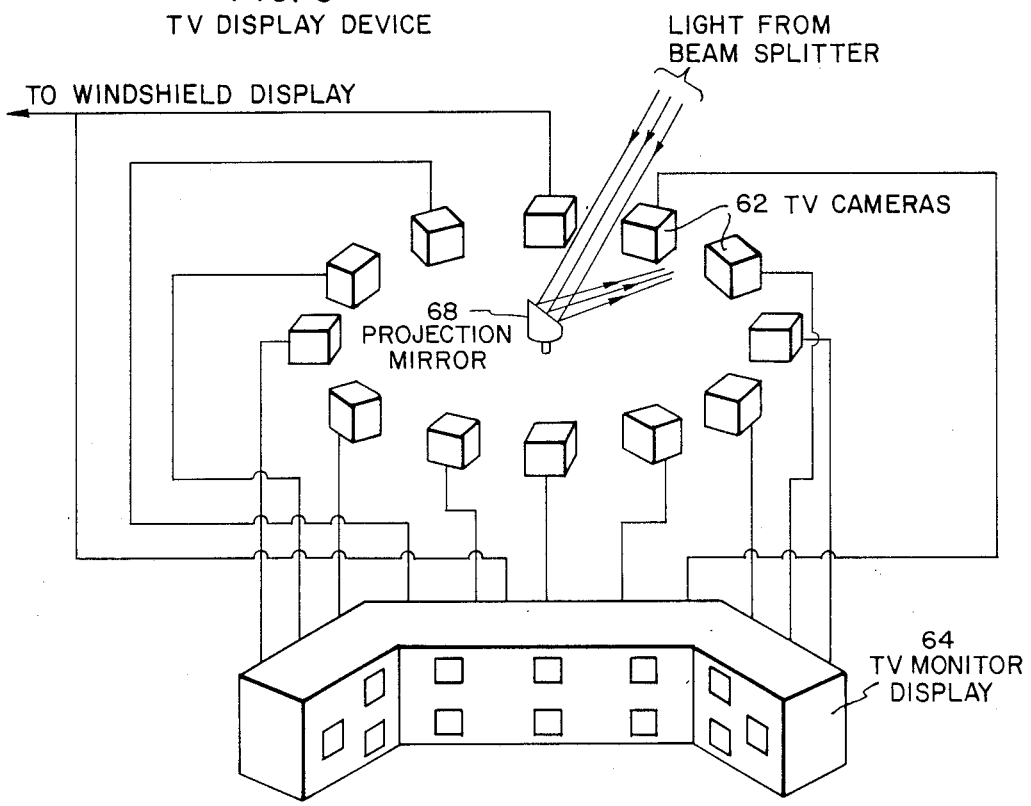
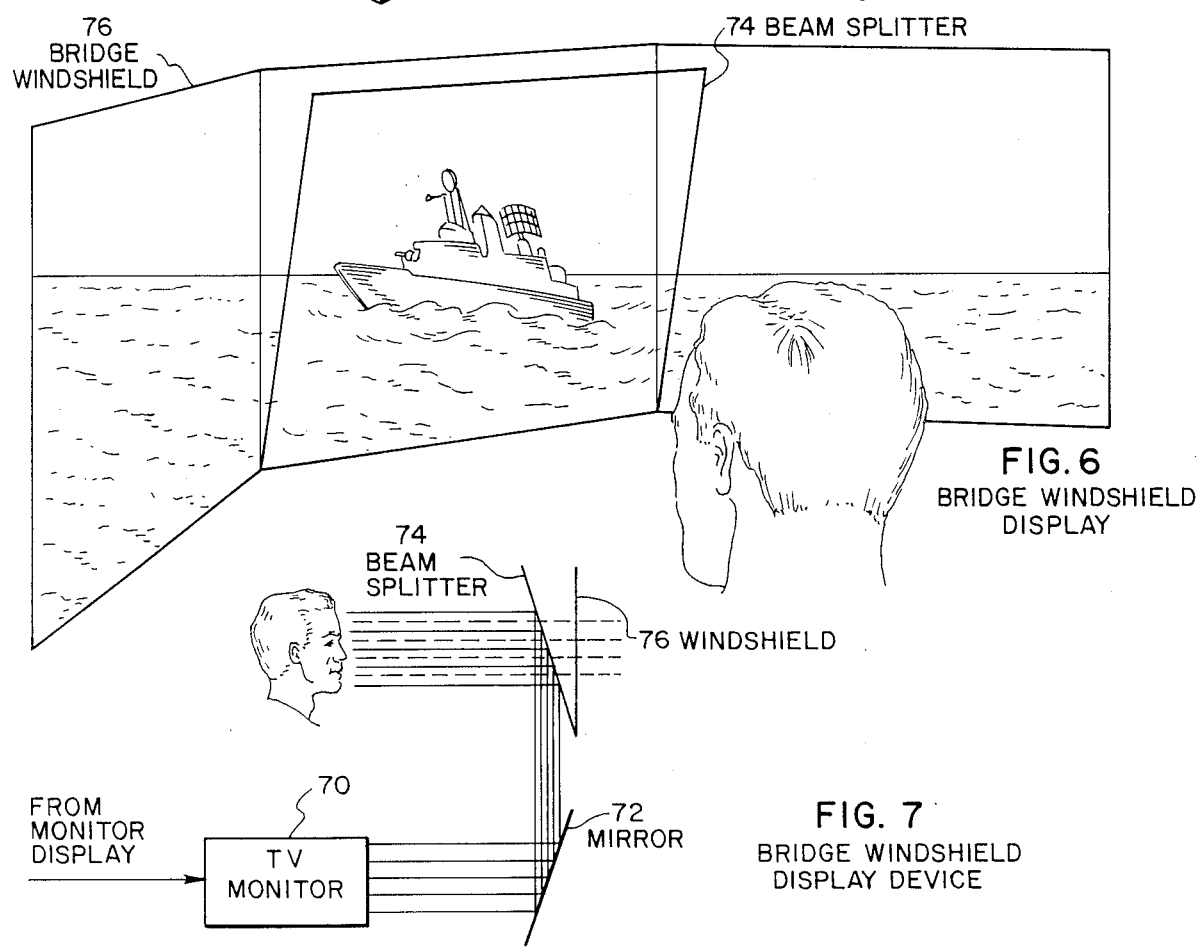
FIG. 6
BRIDGE WINDSHIELD DISPLAY
FIG. 7
BRIDGE WINDSHIELD DISPLAY DEVICE

360 DEGREE OPTICAL SURVEILLANCE SYSTEM

BACKGROUND OF THE INVENTION

The present invention relates generally to infrared scanning systems and more specifically to panoramic surveillance systems for detecting heat producing bodies.

Surveillance systems have been of prime importance to the Navy in both detecting and recognizing enemy and friendly ships and aircraft. Numerous methods and devices have been developed to accomplish these ends. For example, complex monopulse radar systems have been developed that operate at X-band frequencies which can distinguish minute details of targets at great distances. However, these systems often require expensive computer processing equipment to process the high frequency signals for display. In addition, the monopulse hardware is extremely complex and expensive.

Infrared scanning systems have also been used to detect objects at sea. Basically two types have been known to the prior art. One type uses a linear array of detectors located along the elevation axis which are electronically scanned as they are mechanically rotated in the azimuthal plane. This electronic signal is then fed to a television monitor at a remote location for viewing in real time. The great advantage of the infrared scanners over radar apparatus giving similar results is that they are relatively inexpensive in comparison, while still giving detailed target information in nonvisible conditions, e.g., night, haze, etc., at moderate distances. The other type uses a linear array of detectors connected to light emitting diodes (LED's) which are subsequently scanned by a television camera which transmits the picture to a television monitor at a remote location. These systems however show only a narrow sector of the azimuthal plane at any given instant of time. It is desirable to display the entire 360° azimuthal plane at once so that the viewer can search a much larger volume of space. To display the entire azimuthal plane simultaneously, a system with a much larger signal bandwidth is necessary to be compatible with the flicker-fusion rate of the human eye. The bandwidth of the prior art infrared systems would allow scanning rates of only about one per second where the flick-fusion rate requires at least 30 scans per second. Although it is possible to trick the eye through different techniques, flashing a non-refreshed frame twice before presenting a second frame, placing large amounts of memory into the display, etc., the possibility of rotating the scanner head at large angular rates has been explored instead.

One of the problem areas in driving a system at large angular rates is how to pick off the signals from each detector in the array. Normally a mechanically rotating system uses slip rings to accomplish this objective. However, the use of a large number of slip rings, one for each channel, in a rapidly rotating system would introduce noise and mechanical problems that are best avoided.

Additionally the use of slip rings resigns the designer to rotating not only the optics but all the electronic preamp circuits and the detector/cooler assembly at these high rates. It was decided therefore to seek another solution.

Another problem arising out of such a system is how to display, in real time, all the information gathered. A cursory examination of the bandwidth requirements will show, that the display must be capable of holding several hundred megahertz. Bandwidth considerations alone rule out the use of a conventional CRT display. A multigun CRT was considered. However, even a ten gun CRT is inadequate to handle the required bandwidth. A new type of display was needed.

SUMMARY OF THE INVENTION

These limitations and disadvantages are overcome by the present invention which rapidly scans infrared radiation in a 360 degree azimuthal plane to produce a panoramic display. The invention uses a rotating scanning head which transmits the infrared radiation into a derotator which makes the image stationary for projection onto a linear array of infrared detectors. The detectors produce electrical signals which are amplified and transformed into visible light by a linear array of light emitting diodes. This light is rotated at the same angular velocity as the scanning head and projected onto a rotating mirror through a beam splitter. The rotating mirror "paints" a panoramic picture at the same angular velocity which is well above the flick-fusion rate of the eye.

Light from the beam splitter is projected onto another rotating mirror which reflects it onto a series of television cameras. Each camera is connected to a monitor in a display. The camera located at the zero degree position is additionally connected to a monitor on the bridge of the ship for a reflective windshield display.

Also disclosed is a device for observing different ranges of the infrared band in a serial manner.

It is therefore the object of the present invention to provide an inexpensive and effective 360° infrared scanning device.

Another object of the invention is to provide an infrared scanning system with a large signal bandwidth.

Another object of the invention is to provide an effective and simple device for picking off the rotational signals of a high speed rotating scanner.

Another object of the invention is to provide a simple and effective device for displaying a 360° picture.

Other objects, advantages and novel features of the invention will become apparent from the following detailed description of the invention when considered in conjunction with the accompanying drawings wherein:

BRIEF DESCRIPTION OF THE DRAWINGS

FIG. 5 is a diagram of a television monitor display.
FIG. 6 is a diagram of a bridge windshield display.
FIG. 7 is a diagram of the windshield display device.

DETAILED DESCRIPTION OF THE PREFERRED EMBODIMENT

Figure 1:
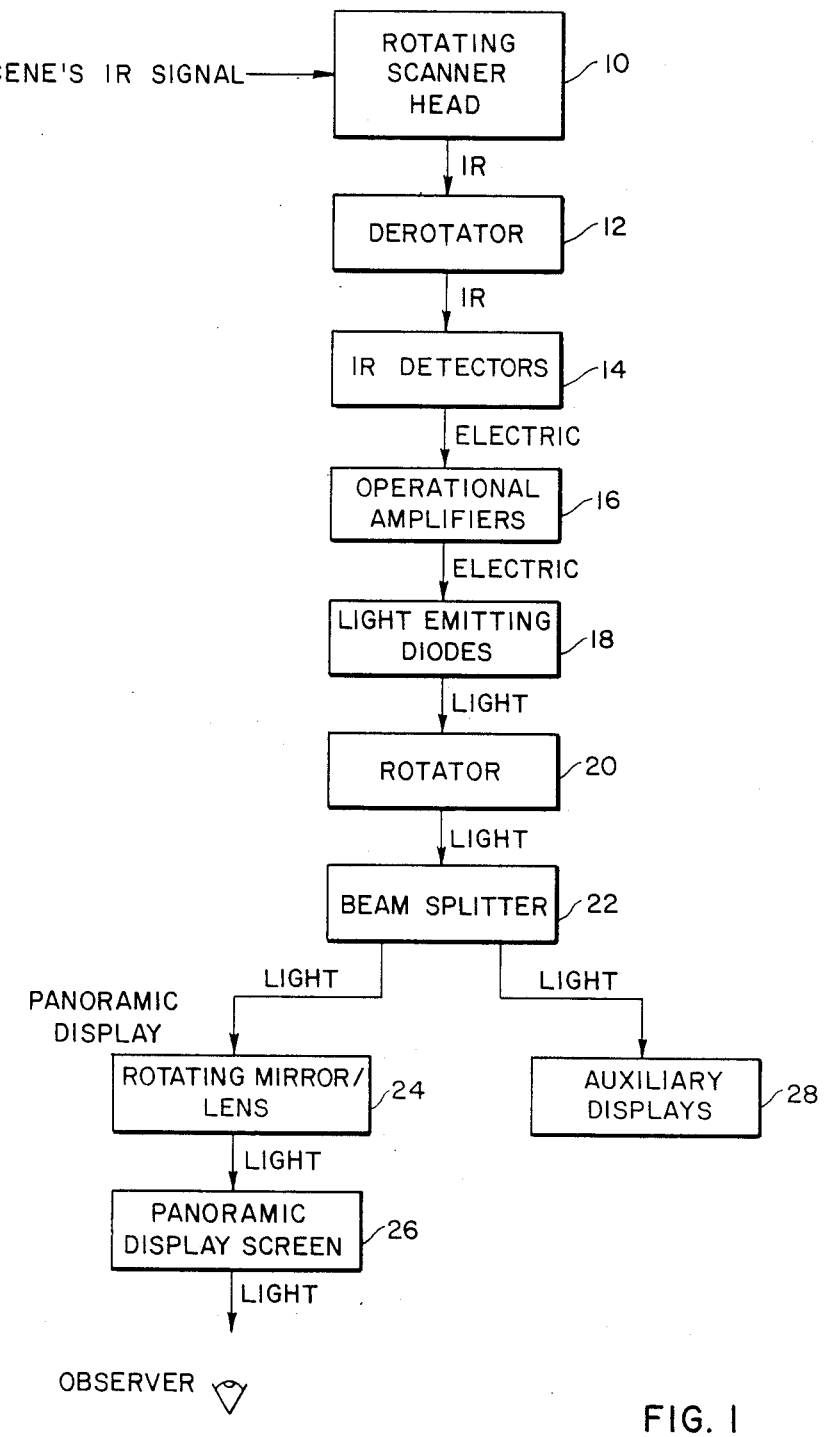
FIG. 1 is a system block diagram of the preferred embodiment.

FIG. 1 is a block diagram of the preferred embodiment as shown in FIGS. 2 through 8. The infrared signal is scanned by a rotating scanner head 10, FIG. 1, such as scanning mirror 30, FIG. 2. The scanned IR signal is focused on a derotating prism 36 by means of an imaging lens 34. The derotating prism 36 aligns the incoming IR signal with the linear array of IR detectors 38 such that a circular scan of the azimuthal plane is effected. The electrical signal produced by the detectors is amplified by amplifiers 40 and transmitted to a remote location via transmission line 42 to light emitting diodes 44. The light emitting diodes 44 produce visible light which varies proportionally with the magnitude of the input signal. This visible light is rotated by rotator 46 at the same angular velocity, ω, as the scanning mirror and projected through a beam splitter 20 to a projector mirror 52 by a projector lens 48.

Figure 3:
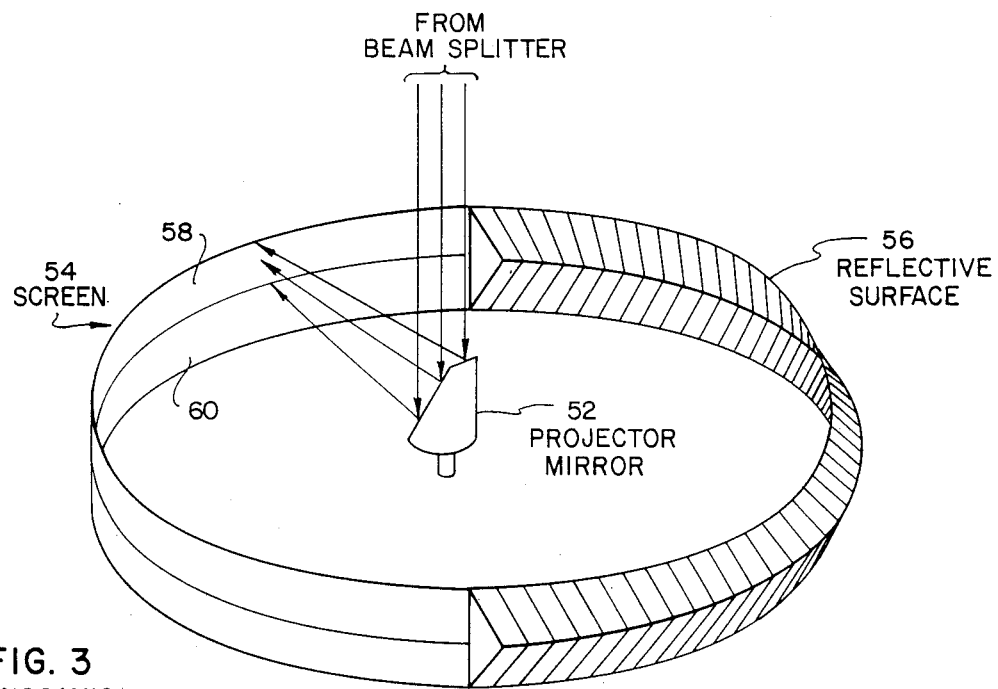
FIG. 3 is a diagram of a panoramic display.

The projector mirror 52 reflects the linear array onto the upper half 58 of a panoramic screen 54 and a reflective surface 56 as shown in FIG. 3. The reflective surface is bent such that the projected rays are reflected back on the lower half 60 of the panoramic screen 54.

Figure 4:
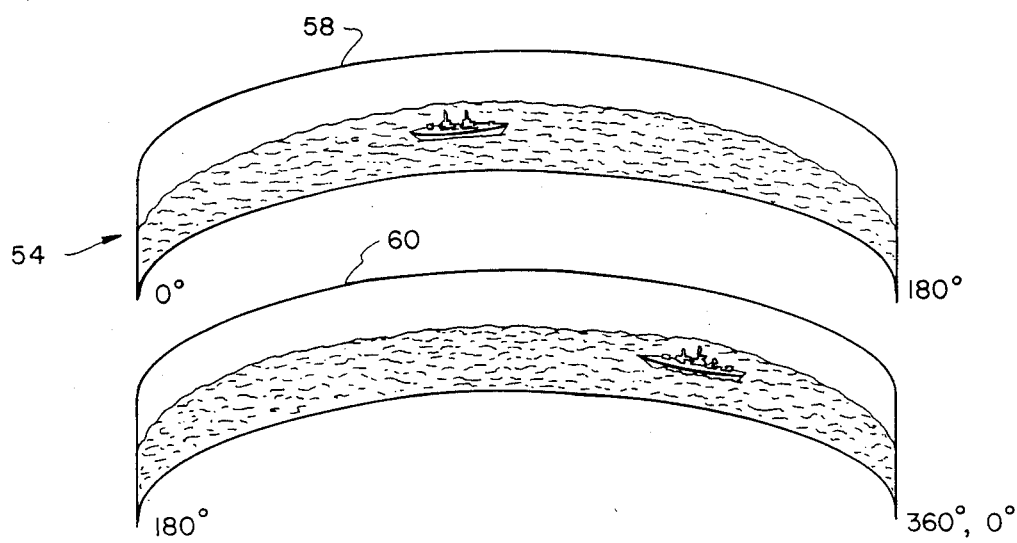
FIG. 4 is a diagram of the panoramic display screen.

The screen 54 is shown in FIG. 4. The upper screen 58 shows the view ranging from zero to 180 degrees while the bottom screen shows the view ranging from 180 degrees to 360 degrees. By using this device the entire 360 degree azimuthal plane can be presented in a 180 degree plane.

Other methods of displaying the data diagramatically shown as auxiliary displays 28, FIG. 1, can either be used in conjunction with or instead of the panoramic view.

FIG. 5 shows a television display where light from the beam splitter is projected onto a series of television cameras 62 (vidicon tubes) by means of another projection mirror 68. Each camera 62 is connected to a separate monitor in the television monitor display 64. The same system could be produced with a single camera connected to a number of storage monitors which are properly multiplexed to cover many sectors of the 360° scene. In either case, a single monitor could be used to produce a bridge windshield display as shown in FIG. 6 by the display device shown in FIG. 7.

The bridge windshield display as shown in FIG. 6 produces an illuminated picture of the scene as it appears directly in front of the bridge by sensing IR heat producing bodies. When viewed it has the effect of headlights by illuminating heat producing objects. FIG. 7 discloses its operation. The monitor 70 which produces a view of the sector directly in front of the bridge is collimated and projected onto a mirror 72 which reflects the scene onto a beam splitter 74 which in turn reflects the scene back to the observer. The observer can view the real scene through the beam splitter 74 and windshield 76 while the illuminated scene is superimposed over it. The monitor 70 of course can be darkened or the beam splitter removed when use of the system is not desired.

Figure 2:
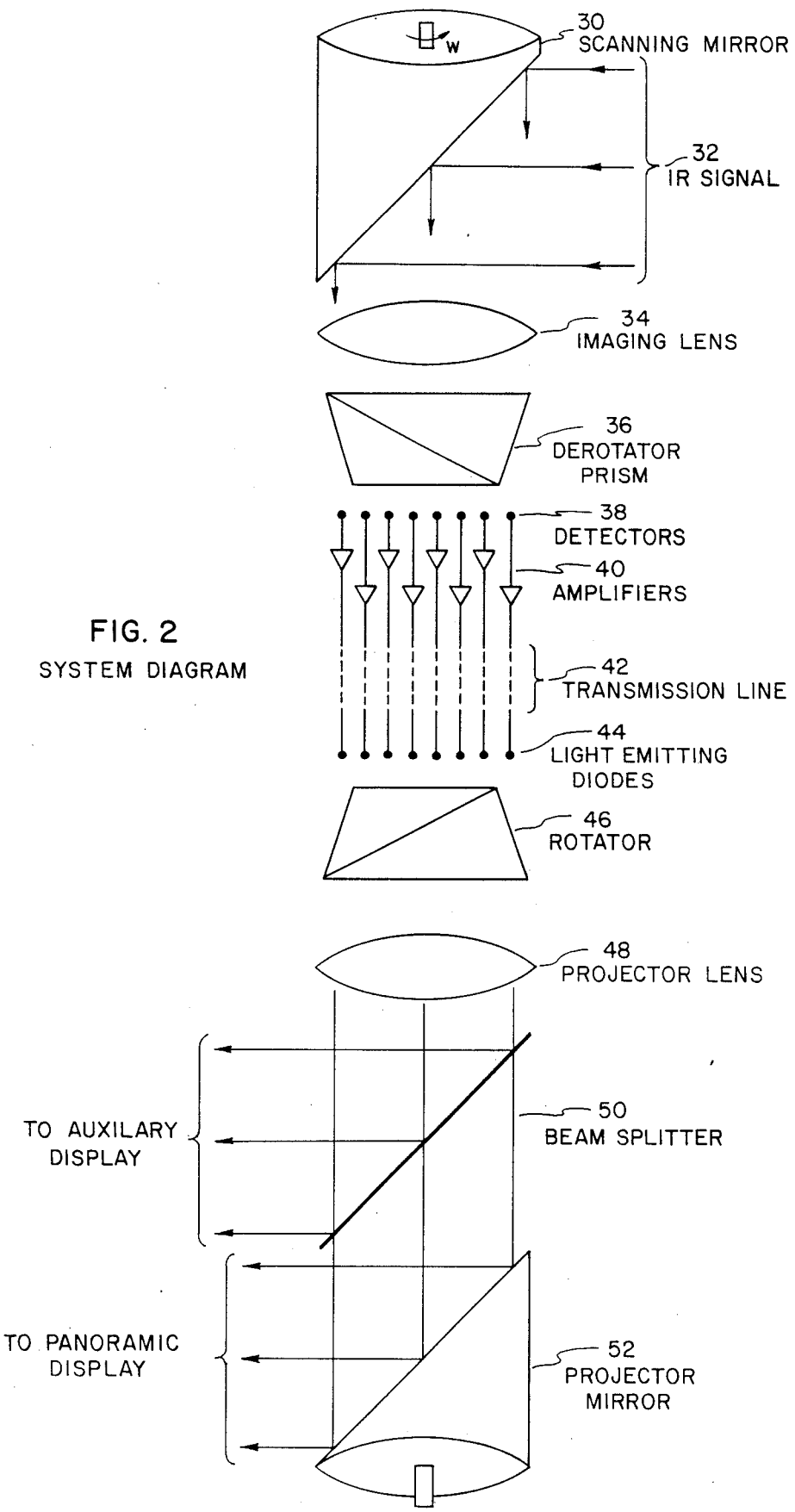
FIG. 2 is a diagram of the preferred embodiment.
Figure 8:
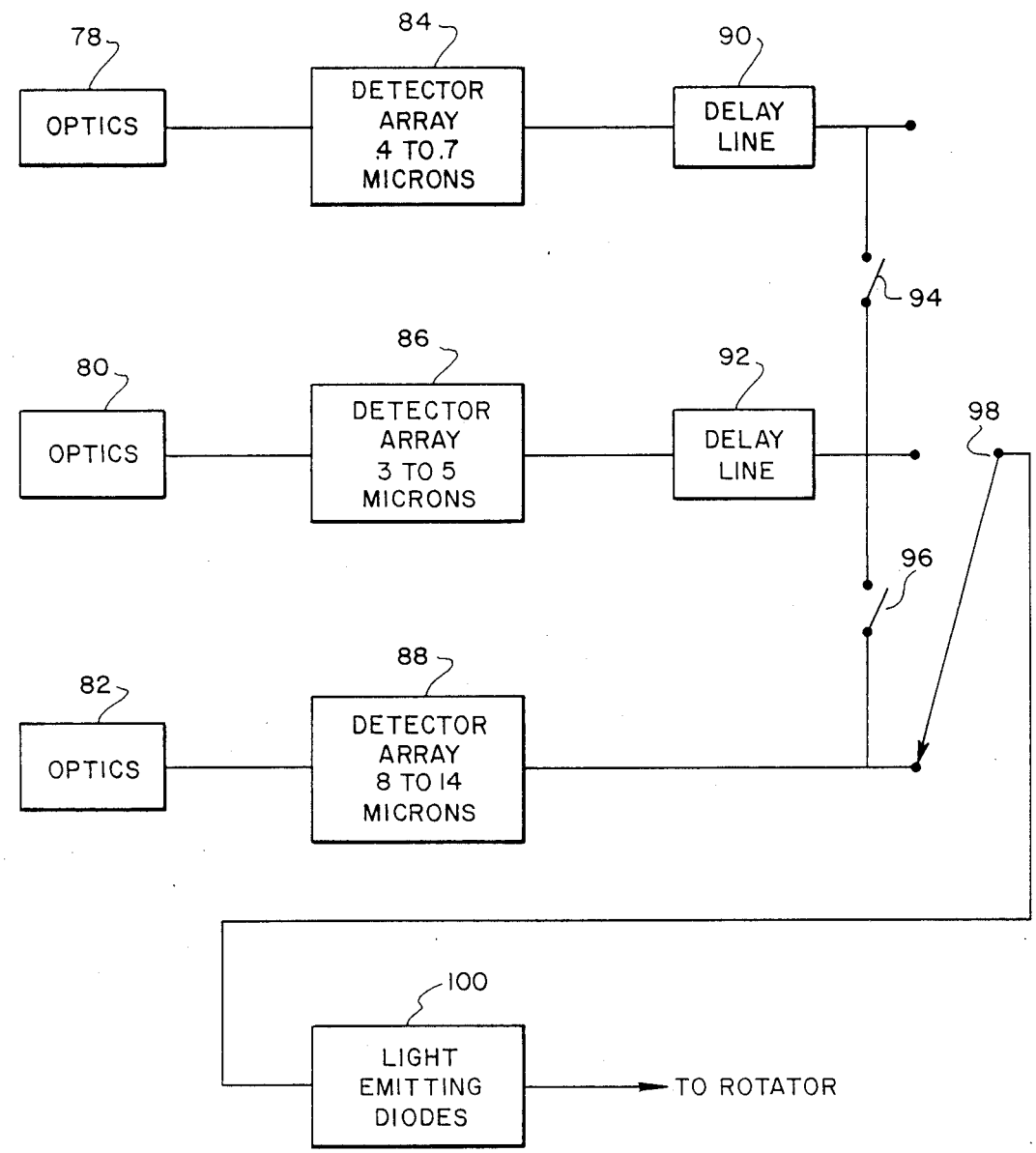
FIG. 8 is a diagram of a device for viewing different ranges of the infrared spectrum.

FIG. 2 discloses a single linear array of detectors. However various arrays to detect different spectral regions of the infrared band could be used as shown in FIG. 8. For example, array 84 could respond to visible light from 0.4 to 0.7 microns, array 86 could respond to near visible light from 3 to 5 microns, while array 88 could respond to 8 to 14 microns. Switch 98 connects any one of these arrays to the light emitting diodes 100 while switches 94 and 96 permits the observer to view the different bands simultaneously. Delay lines 90 and 92 properly overlay the data. Optics 78, 80, and 82 must be properly boresighted to avoid paralax when several bands are being used.

The advantage of this system is that it produces panoramic imagery of the 360 azimuthal plane every 1/30th of a second. This is a significant improvement over the prior systems which were able to scan sector by sector over 360 degree in four to five minutes. Thus large amounts of information can be acquired and displayed in a useful format for an observer.

Obviously many modifications and variations of the present invention are possible in light of the above teachings. It is therefore to be understood that within the scope of the appended claims the invention may be practiced otherwise than as specifically described.

What is claimed as new and desired to be secured by Letters Patent of the United States is:

1. A 360 degree infrared surveillance system for producing a visible display of heat producing bodies comprising:
   rotating means for scanning a 360° azimuthal plane at an angular velocity faster than the flicker fusion rate of the eye;
   derotating means for projecting infrared light from said rotating means for scanning to a stationary position;
   detector means disposed at said stationary position to convert said infrared light into an electrical signal;
   means for emitting visible light when varies in amplitude proportionally to the amplitude of said electrical signal produced by said detector means;
   means for rotating said visible light at the same angular velocity as said rotating scanner;
   a rotating projection mirror;
   a cylindrical screen located around said rotating projection mirror;
   a cylindrical reflective surface disposed opposite said screen to reflect light from said projection mirror onto a portion of said screen.

2. The surveillance system of claim 1 wherein said detector means comprises:
   more than one detector array responsive to various frequency ranges of infrared light;
   means for selectively connecting one or any number of said arrays to said means for emitting visible light.

3. The device of claim 2 wherein each said array has separate optical means for scanning and derotating said infrared light.

4. A 360 degree infrared surveillance system for producing a visible display of heat producing bodies comprising:
   rotating means for scanning a 360° azimuthal plane at an angular velocity faster than the flicker fusion rate of the eye;
   derotating means for projecting infrared light from said rotating means for scanning to the stationary position;
   detector means disposed at said stationary position to convert said infrared light into an electrical signal;
   means for emitting visible light which varies in amplitude proportionally to the amplitude of said electrical signal produced by said detector means;
   means for rotating said visible light at the same angular velocity as said rotating scanner;
   rotating projection means for deflecting said visible light;
   at least one television camera disposed to scan said deflected visible light;
   at least one television monitor for displaying said scanned light.

5. The surveillance system of claim 4 further comprising:
   means for superimposing the picture produced by at least one of said television monitors on the screen as viewed by an observer.

* * * * *